Patented Mar. 31, 1942

2,278,064

UNITED STATES PATENT OFFICE 2,278,064

SULPHONATES

Martin de Simó, Piedmont, and John J. O'Connor, Oakland, Calif., assignors to Shell Development Company, San Francisco, Calif., a corporation of Delaware No Drawing. Original application August 29, 1939, Serial No. 292,444. Divided and this application August 4, 1940, Serial No. 351,440

7 Claims. (Cl. 260—513)

This invention relates to new compositions of matter and methods for their production as well as the application of these compositions to many technically important uses. More particularly the invention relates to sulphonates and deals with a novel class of compositions comprising allyl type sulphonic acids having five or more carbon atoms per molecule and salts, esters and other derivatives of such acids.

An important object of the invention is the preparation of a new type of capillary active compositions having improved properties. A further object is the provision of methods for manufacturing the new compositions of the invention by a novel and easily conducted process which gives products of high quality. Still another object is to apply these new compositions in a wide variety of uses where their desirable properties offer particular advantages.

In spite of the superior stability of sulphonic acids and their salts, compounds of this type have had only very restricted technical application compared with the less stable carboxylic acid and sulphuric acid ester salts because of the low solubility of the previously available sulphonates. It has now been found that sulphonate compositions such as are obtainable by reacting allyl type halides having five or more carbon atoms per molecule with suitable sulphites are not only surface active but also are much more soluble in water and many other solvents and are superior for many applications such, for example, as wetting agents and detergents, to the corresponding saturated sulphonates. The new sulphonate compositions are useful frothing agents particularly adapted for use as interface modifying agents under conditions of acidity or alkalinity at which soaps are less suitable. Those of five to ten or more carbon atoms are excellent froth flotation agents and may be used in the presence of either acid or alkali. The new compositions containing sulphonates having eight to twenty carbon atoms per molecule are desirable wetting agents, particularly useful in the cleaning and processing of textiles. They are especially advantageous in acid baths for the fulling of wool, in acid dyeing and in acid carbonizing media as well as in mercerizing liquors of high alkalinity.

The improved products of this invention may be prepared by reaction of allyl type halides with alkali metal, alkaline earth, heavy metal, ammonium and like, preferably water-soluble, sulphites. The resonant position of the double bond and the reactive group may lead to rearrangement in this type of reaction. There may also be some hydroxy-sulphonate formation as a result of addition of bisulphite to the double bond but this is not detrimental in most cases. The availability of inexpensive starting materials makes this an attractive method of producing the novel sulphonates. The highest yields have been obtained with allyl type halides having the halogen in a primary position, or which undergo rearrangement to such primary allyl type halides under the reaction conditions, but sulphonates have been successfully produced also by reaction of secondary allyl type halides which are not capable of allylic rearrangement to primary halides, with sodium sulphite. The allyl type secondary halides of five to about ten carbon atoms per molecule give higher yields in most cases than the corresponding higher molecular halides. For the preparation of the new sulphonates of the invention by the reaction of alkali metal or like sulphites, the preferred allyl type halides are those of the type of, for example, 1-chloropentene-2, 1-chlorohexene-2, 1-chloro-2-butyl-propene-2, 1-chloroctene-2, 1-chlor-2-ethyl-hexene-2, 1-chloro-7-methyloctene-2, 1-chloro-2, 7-dimethyl-octene-2, 1-chloro-2-octyl-propene-2, 1-chloro - 8 - ethyl - decene-2, 1-chloro-2-undecyl-propene-2, 1-chloro-2-methyl-tetradecene-2 and homologues thereof. Other allyl type halides which may be used include 3-chloro-2-methyl-pentene - 1, 4 - chloro - hexene - 2, 3 - chloro - 3-methyl-pentene-1, 3-chloro-hexene-1, 3-chloro-2-methyl-hexene-1, 3-chloro-2,3-dimethyl-pentene-1, 3-chloro-octene-1, 3-chloro-decene-1, 1-chloro - 2,3 - dimethyl - dodecene-2, 1-chloro-3,9-diethyl-undecene-2 and the like. Instead of the individual allyl type halides, mixtures may be used which may contain other halides and/or other compounds which may be inert under the reaction conditions or may undergo change without inhibiting the desired sulphonate formation. Thus mixed chlorides produced, for example, by high temperature chlorination of olefine containing hydrocarbon in accordance with U. S. Patents 2,077,382 and 2,130,084, may advantageously be used as starting material. Pyrolysis of dihalides formed by addition of halogen to olefines of six or more carbon atoms having the double bond preferably not more than once removed from the end of the chain provides another suitable source of allyl type halides for use in the process of the invention, which can be advantageously used with such starting material to separate vinyl type halides from the allyl type halides since the former are substantially unreactive under the preferred conditions for reacting allyl type halides of six or more carbon atoms with sodium sulphite and the like. The process is preferably carried out using an excess of sulphite and a temperature of the order of 100° to about 200° C. It may be applied to the purification of allyl type halides containing an organic halide having a halogen atom further removed from the double bond.

Other methods of preparing the new sulphonates include dehydration of suitable hydroxy sulphonates, such for example, as those having a hydroxyl group attached to a carbon atom once removed from the sulphonated carbon atom and the like. Such methods are economically less attractive at present because of the higher cost of starting materials as compared with the preferred methods using halides.

The novel compositions containing sulphonates of six or more carbon atoms per molecule of the invention may be used in the form of the free sulphonic acids or as salts of any basic reacting substance which provides a cation to replace the hydrogen atom of the sulphonic acid group or as esters or other suitable derivatives of such sulphonic acids. The ammonium, alkali metal, alkaline earth metal and amine salts, including alkylolamine salts, for example, are useful where the sulphonates are to be used as wetting agents, detergents, forthing and emulsification agents and the like. The copper, mercury and lead salts have valuable insecticidal and fungacidal uses. Esters, such as ethyl esters of straight-chain primary allyl type sulphonates of 18 to 24 carbon atoms, for example, may be used as components of dielectric liquids.

The new compositions may be applied in the form of solutions in water, alcohol, acetone or other suitable solvents or as pastes or suspensions or emulsions whether aqueous or not or as anhydrous materials. The sulphonates of the invention may be used in a pure form such, for example, as the product of crystallization from alcohol or other suitable solvents, or in admixture with other materials. Thus the crude products obtained in manufacture and containing inorganic salts and/or organic compounds which may or may not be sulphonates or the like may be advantageously used for many purposes without purification. Where it is desirable, however, the new sulphonate compositions may be purified by extraction, for example, taking advantage of the greater water solubility of these new compounds as compared with the corresponding saturated and/or hydroxy sulphonates and the like. The pure sodium salts, for example, crystallize as fine plates. They are soap-like and form clear, non-viscous solutions which give a copious, persistent foam on agitation. Such solutions have a higher tolerance for calcium salts than solutions of the corresponding saturated sulphonates. The aqueous solutions take up large amounts of ether, benzene and similar water immiscible liquids to form clear solutions and by addition of further amounts of such liquids or of water, form emulsions.

The following examples illustrate the preparation of typical aliphatic sulphonates of our invention.

*Example I*

In a chromium-lined autoclave, 0.271 mol of 3-chloroctene-1, 0.385 mol of sodium sulphite and 500 grams of water were heated with good agitation for 2½ hours at 120° C. to 130° C. The total conversion of chloride was 89%. The aqueous reaction product was evaporated to dryness and the residue extracted with ethyl alcohol. The sulphonated product was crystallized from the ethyl alcohol solution as white crystals of the following composition:

| | C | H | S | Na | O (By diff.) | Bromine number gms. Br² per 100 gms. |
|---|---|---|---|---|---|---|
| Found percent | 43.6 | 7.1 | 15.8 | 9.1 | 24.4 | 62.0 |
| Calculated for $C_8H_{15}SO_3Na$ percent | 44.82 | 7.06 | 14.97 | 10.73 | 22.41 | 74.6 |

The yield of sulphonate was 61% of which 83.2% was allyl type sulphonate as indicated by bromine number and 16.8% was hydroxylsulphonate.

*Example II*

In the same apparatus, 0.200 mol of 3-chlorpentadecene-1, 0.236 mol of sodium sulphite and 340 grams of water were heated with agitation for three hours at 175° C. The reaction product was recovered and purified as in Example I, a conversion of 89.6% being obtained. Analysis showed that 67.3% of the product was allyl type unsaturated sulphonate and 32.7% was hydroxysulphonate.

*Example III*

4-chlorohexene-2 and 4-chloroctene-2 were separately reacted with an aqueous solution of 15 mol % excess of sodium sulphite in a Carius tube in a steel jacket arranged for shaking. After two hours at 125° to 130° C. it was found that conversions of 99.0% and 89.3% respectively, had been obtained. After separation of hydrolysis products and unreacted chloride the allyl type sodium sulphonates produced could be readily recovered from their aqueous solution as in Example I.

*Example IV*

By the same method as used in Example III 3-chlorohexene-1 and 1-chloropentene-2 were reacted, the conditions and results being as follows:

| | Temperature | Time | Reacted | Sulphonate yield (Based on chloride reacted) |
|---|---|---|---|---|
| | °C. | Hours | Percent | Percent |
| 3-chlorohexene-1 | 130 | 2.25 | 88.0 | 68.2 |
| 1-chloropentene-2 | 130 | 1.25 | 91.4 | 79.2 |

Although the sulphonates described as specific examples are derived from straight-chain halides of five to fifteen carbon atoms per molecule, it is to be understood that the invention should not be so limited. Other allyl type halides may be reacted by the previously described methods to produce new sulphonate compositions comprising, for example, branched-chain aliphatic sulphonates, such as 7-methyl-2-octene sulphonic acid, 2-methyl-2-hexenesulphonic acid, 1-methyl-1-butyl-2-butenesulphonic acid

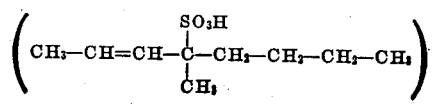

1,3,5-trimethyl-1-propyl-2-hexenesulphonic acid and the like, cyclic sulphonates such as

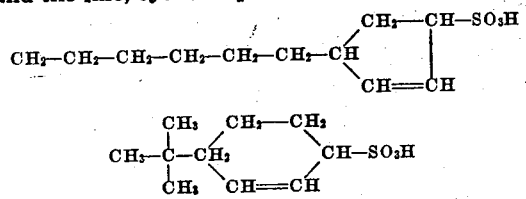

and the like and suitable homologues, analogues and substitution products of such allyl type sulphonic acids. It is preferred, however, in preparing the new compositions of the invention not to employ methods which involve the production of compounds containing other polar groups attached to the sulphonated carbon atom. The presence of chlorine atoms, phenyl groups and the like in the sulphonate molecule may be advantageous for certain purposes.

This application is a division of our copending application Serial No. 292,444, filed August 29, 1939, now U. S. Patent 2,243,331.

We claim as our invention:

1. A process for producing sulphonates which comprises reacting an allyl type halide having at least five carbon atoms per molecule with an inorganic sulphite at a temperature at which a sulphonic acid salt corresponding to said sulphite is formed.

2. A process for producing a capillary-active sulphonate which comprises reacting an allyl type primary chloride having at least five carbon atoms per molecule with sodium sulphite at a temperature between 100° and 200° C. at which substitution of a sodium sulphonate group for chlorine takes place.

3. A process for producing a capillary-active sulphonate which comprises reacting an allyl type secondary halide having at least five and not more than ten carbon atoms per molecule which is capable of undergoing allylic rearrangement to the corresponding primary halide with a molecular excess of an inorganic sulphite at a temperature at which a sulphonic acid salt corresponding to said sulphite is formed.

4. A mixture comprising an allyl type primary sulphonate, a rearrangement product thereof and a hydroxy sulphonate obtainable by reacting an aliphatic allyl type primary mono-chloride having at least five and less than twenty carbon atoms per molecule with sodium sulphite.

5. A mixture comprising an allyl type primary sulphonate, a rearrangement product thereof and a hydroxy sulphonate obtainable by reacting a primary allyl monohalogenated hydrocarbon having at least five carbon atoms per molecule and an inorganic sulphite.

6. A mixture comprising an allyl type sulphonate, a rearrangement product thereof and a hydroxy sulphonate obtainable by reacting an allyl type halide having at least five carbon atoms per molecule and an inorganic sulphite.

7. A process for purifying a vinyl type organic halide containing an organic halide having a halogen atom further removed from the double bond comprising treating said halide with an aqueous solution of an inorganic sulphite at between about 100° C. and 200° C. and separating the resulting aqueous sulphonate solution from said vinyl type organic halide.

MARTIN DE SIMÓ.
JOHN J. O'CONNOR.